No. 811,983. PATENTED FEB. 6, 1906.
J. WILKINSON.
VALVE MECHANISM FOR FLUID MOTORS.
APPLICATION FILED FEB. 2, 1905.

2 SHEETS—SHEET 1.

WITNESSES:
Edwin L. Bradford
P. H. Burch

INVENTOR
James Wilkinson
BY
Phil. D. Johnston Jr.
ATTORNEY

No. 811,983. PATENTED FEB. 6, 1906.
J. WILKINSON.
VALVE MECHANISM FOR FLUID MOTORS.
APPLICATION FILED FEB. 2, 1905.
2 SHEETS—SHEET 2.
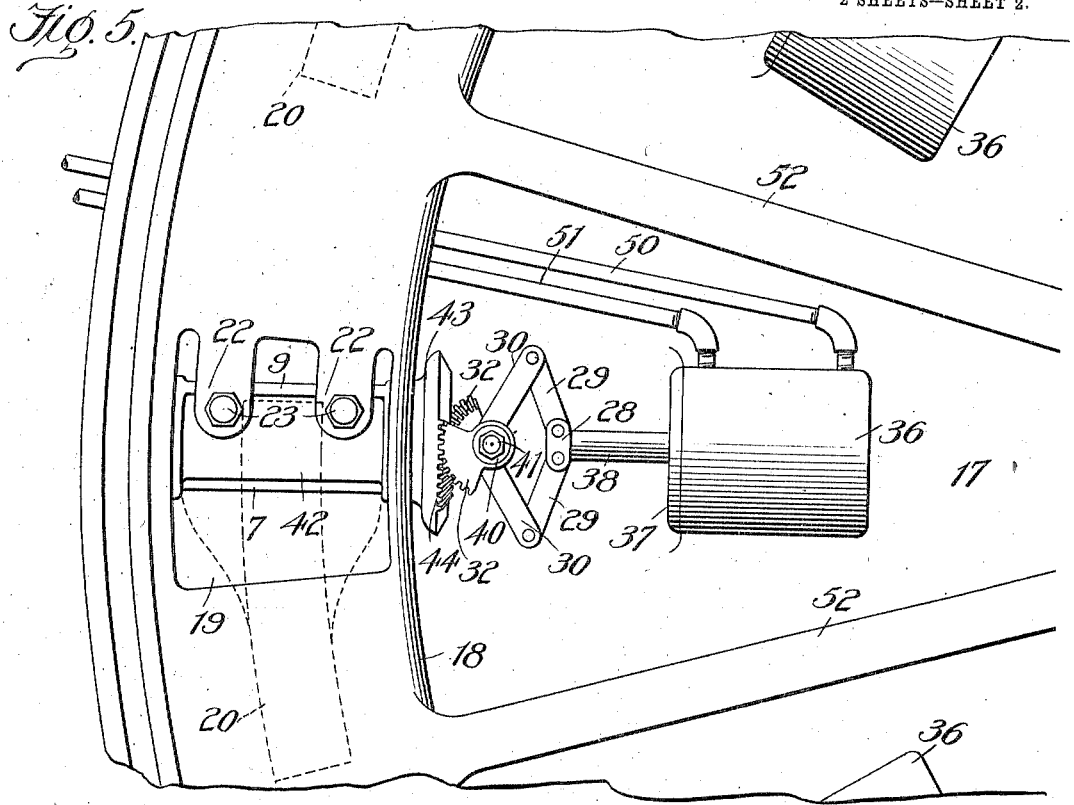
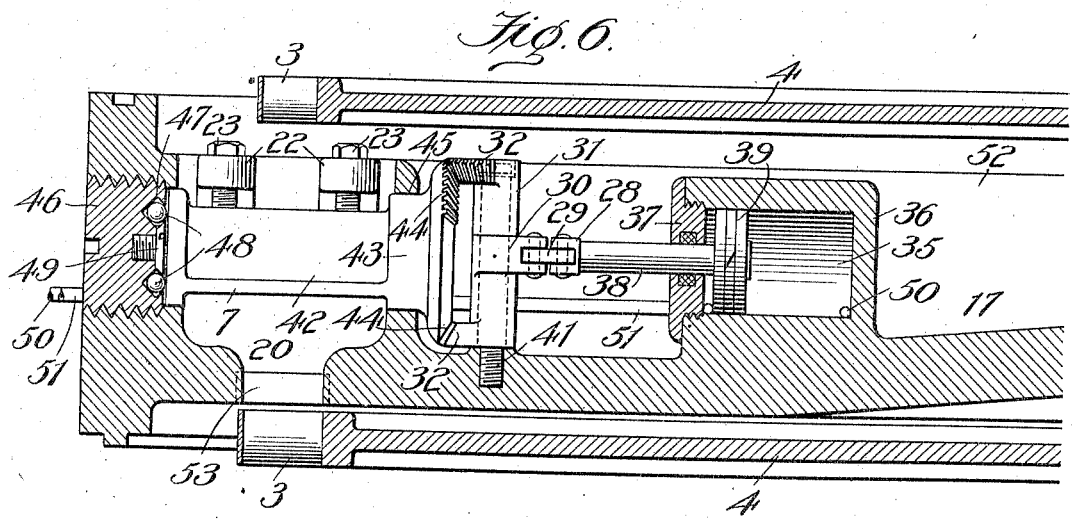
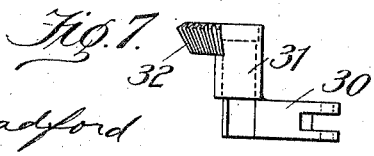
WITNESSES:
Edwin L. Bradford
P. H. Burch
INVENTOR
James Wilkinson
BY
[signature]
ATTORNEY

UNITED STATES PATENT OFFICE.

JAMES WILKINSON, OF BIRMINGHAM, ALABAMA, ASSIGNOR TO WILKINSON TURBINE COMPANY, A CORPORATION OF ALABAMA.

VALVE MECHANISM FOR FLUID-MOTORS.

No. 811,983.　　　　Specification of Letters Patent.　　　　Patented Feb. 6, 1906.

Application filed February 2, 1905. Serial No. 243,883.

*To all whom it may concern:*

Be it known that I, JAMES WILKINSON, a citizen of the United States, residing at Birmingham, in the county of Jefferson and State of Alabama, have invented new and useful Improvements in Valve Mechanism for Fluid-Motors, of which the following is a specification.

My invention relates to valve mechanism for fluid-pressure motors, more particularly adapted for use in turbines and similar rotary motors.

In a pending application I have described and illustrated a valve-operating mechanism wherein power-increasing devices were utilized to transmit motion from a motor or actuator to a reciprocating valve.

It is one object of my present invention to adapt such an operating mechanism for use in connection with rotary or semirotary valves. I provide stops which arrest the valves' travel when they reach a closed position and constitute fulcrums in connection with which the operating mechanisms act to force the valves firmly against their seats.

It is a further object to adapt the operating mechanism to control supply or stage valves for a multistage-turbine, the motor and power-increasing devices being disposed within or without the turbine, as may be desired.

It is a further object of my invention to provide a turbine with nozzle-passages having radially-elongated admission ends and circumferentially-elongated discharge ends and to adapt my rotary valves to control the supply of motor fluid to these nozzles.

My invention comprises the details of construction and arrangement of parts hereinafter more particularly described and claimed, reference being had to the accompanying drawings, wherein are illustrated several constructions capable of operating in accordance with my invention.

Figure 1:
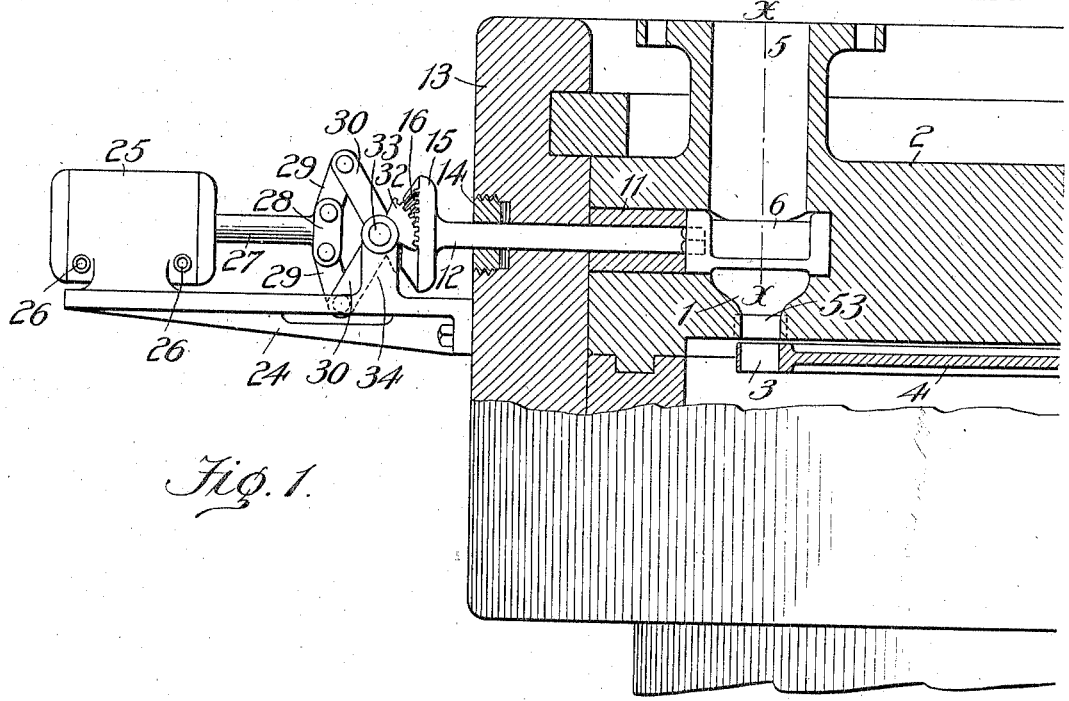
Figure 2:
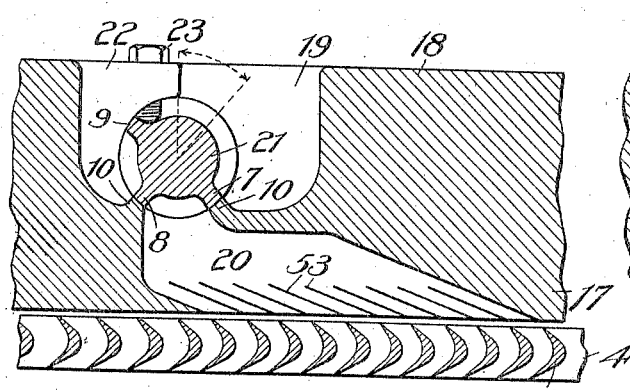
Figure 3:
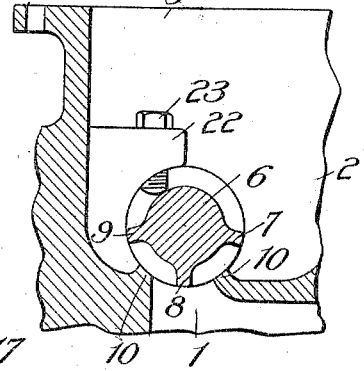
Figure 4:
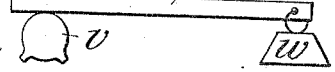

Figure 1 is a side view, partially in section, of a turbine, showing a supply-nozzle controlled by a rotary valve which is actuated by power-increasing devices disposed without the turbine. Fig. 2 is a sectional view through $x \, x$, Fig. 1. Fig. 3 is a partial sectional view through a diaphragm-partition between wheel-compartments in a multistage-turbine, illustrating the rotary valve in its closed position. Fig. 4 is a diagrammatic view illustrating the manner in which the leverage obtained by the power-increasing devices acts against the stops or fulcrum-screws to force the valve against its seat. Fig. 5 is an enlarged plan view, broken away, of a diaphragm-partition, showing the valve-actuating mechanism disposed within the turbine. Fig. 6 is a vertical sectional view through Fig. 5, showing the motor-casing and valve-seat in section and the valve and its actuating mechanism in side elevation. Fig. 7 is a detail view of a sector-gear and lever.

Similar reference characters refer to similar parts throughout.

I have illustrated my invention as applied to an elastic-fluid turbine, where the advantages gained by its use in large power units are greater than in most other motors in view of the large number of small valves required to properly control the flow of motor fluid through its supply and stage nozzles. I do not, however, desire to limit my invention to use in a turbine, as its advantages apply with equal force to any fluid-motor where a rotary valve is now or could be advantageously used.

The turbine shown is of the impact axial-flow type comprising any desired number of motor-fluid-supply nozzles 1, leading through the supply-head 2 and discharging against peripheral buckets 3, carried by a rotor wheel or drum 4, keyed to the turbine-shaft. (Not shown.) There may be as many nozzles as desired; but since they are similar only one and its controlling-valve will be shown and described. Motor fluid-pressure is supplied to this nozzle through a port under the control of a rotary valve 6, seated in the head and reduced between its circular end portions to form two parallel valve-lips 7 and 8 and a rib or shoulder 9. The nozzle is provided with a radially-elongated supply end having two parallel admission edges 10, which are engaged by the valve-lips 7 and 8 to close the nozzle. The nozzle throughout its intermediate portion it gradually narrowed radially and widened peripherally of the head until at its discharge end its width corresponds with the depth of the buckets 3, while its circumferential length enables it to discharge fluid simultaneously against a number of the buckets. This arrangement is of particular advantage in connection with rotary valves, whose motors may be conveniently arranged in close proximity and in radial alinement with their respective valves. Above the admission edges the supply-passage is cut away on each side of the valve opposite to its intermediate reduced portion to permit the free flow of the fluid-pressure around the valve and between it and both admission edges of the nozzle when the valve-lips 7 and 8 are out of engagement with the edges, as seen in Fig. 3. The manner in which these lips overlap the edges 10 will permit a slight travel of the valve after it has closed. The valve is preferably inserted into a circular opening bored radially into the periphery of the head and intersecting the supply-passage immediately above the admission end of the nozzle-passage. The valve after being inserted is held in place by a block 11 and operated by a stem 12, having a squared end which passes through the block and enters a squared recess in an end of the valve. This stem continues through an opening in an outer shell 13 for the turbine, being suitably packed at 14 to prevent the escape of pressure which has access to both ends of the valve, and thus practically balances it against end thrust. The stem 12 has a bevel-wheel 15, secured to or formed integral with its outer end and provided with two oppositely-disposed segmental sets of gear-teeth 16.

When the turbine is subdivided into stages by diaphragm-partitions 17, Fig. 2, the latter will be provided with a peripheral shoulder 18, in which are formed enlarged supply-bowls 19 for the stage-nozzles 20. A rotary stage-valve 21, similar to the supply-valve, but of larger proportions to correspond with the increased area of the stage-nozzles, is disposed radially across this bowl and provided with a rib 9 and lips 7 and 8, which engage the admission edges 10 of the stage-nozzle. To avoid the use of a larger number of valves to control the increased volume of motor fluid as it passes from stage to stage, it is my purpose to utilize the same number of valves for each stage, increasing the capacity of the successive stage-valves rather than their number. This can be effected in a manner to supply the fluid-pressure to the whole periphery of the bucket-wheel, when such is required, as in the low-pressure stages, by forming the nozzles, as shown in Fig. 2, with their radially-elongated admission ends of the requisite cross-sectional area, while their elongated peripheral discharge ends form a complete annular discharge-orifice for the stage fluid-pressure. Thin division-plates 53 will be utilized in this construction to direct the discharge of the fluid stream against the buckets. These plates may also be used in the supply-nozzles. At one side of the supply-chamber for valve 6 and of the bowl for valve 21 I provide two overhanging shoulders 22, having adjustable set-screws 23 screwed downwardly through threaded openings in their ends. The rounded ends of these screws enter the path of the rib 9 and by engagement with the same act as stops to arrest the travel of the valve at a point where the lips 7 and 8 close the nozzle. These screw-stops further constitute an adjustable fulcrum for the valve, against which the operating mechanism acts with the leverage effect, hereinafter explained, to force the valve against its seat. The adjustability of the fulcrum enables the leverage on the valve to be varied. The stage-valves may be inserted in the diaphragm in the same manner as the supply-valves 6 are inserted in the head and provided with similar operating-stems 12, having gear-wheels 15. The operating mechanism for these supply and stage valves comprises a frame 24, bolted to the turbine shell or casing and carrying at its outer end a fluid-motor comprising a cylinder 25, having ports 26 at each end of the admission of controller-fluid pressure and a piston whose rod 27 is adapted to be moved always a full stroke by said controller-pressure. The rod 27 has a cross-head 28 connected through toggle-links 29 to the outer ends of lever-arms 30, each of which is preferably formed integral, as shown in Fig. 7, with a bearing-sleeve 31, carrying at one end a segmental bevel or sector gear 32, disposed oppositely to its respective lever-arm. These two sleeves 31 are mounted upon a stationary axis 33, journaled in standards 34, integral with the frame, and have their segmental gears so disposed as to engage the two sets of gear-teeth on the bevel-wheel 15, through which they are adapted to operate the rotary valves 6 and 21. The segmental gears 32 and the sets of teeth 16 on the gear-wheel have meshing surfaces calculated to give the valve a travel sufficient to fully open or close it, which, as shown, is about thirty degrees.

The toggle connections between the motor and the operating-gears for the valve act like a toggle-press to exert pressure when the movement of the valve is opposed, which increases in power as the angle between the toggle-links vanishes. The set-screws 23 are adjusted to engage the rib 9 just as the lips 7 and 8 of the valve move over the admission edges 10 of the nozzle to close it. This takes place when the toggle connections are about in the position shown in Fig. 1, when the motor, through the toggle-press and gears, is capable of exerting the greatest power upon the valve. The manner in which the power of the motor can be multiplied by the leverage devices described is illustrated in its simplest form in Fig. 4. Here a one-pound weight $w$ is suspended from a lever $l$, having a fulcrum $s$ and engaging a valve $v$. The static energy of the weight increases relatively as its distance from the fulcrum exceeds the distance of the valve therefrom. In other words, the length of the lever from $w$ to $s$ being about fifteen times that from $v$ to $s$, the weight exerts a pressure of fifteen pounds on the valve. The toggle-press, though differing slightly in its action from the device described, since its increased power is obtained by reducing the length of the lever from $v$ to $s$, has practically the same effect and not only acts to force the valve with great power against its seat, so that all leakage is prevented, but it also acts to multiply the power of the motor as applied to opening the valve, which is unbalanced by the fluid-pressure when seated. Further, the action of the toggle-link connections tends to retard the travel of the valve on the point of seating, and thus prevents its hammering against the stop-screws.

In Figs. 5 and 6 I have illustrated a preferred mechanism for operating stage-valves, in which the motor and the toggle-press are disposed within the turbine and mounted upon a diaphragm 17. In these figures the valve-motors comprise cylinders 35, formed in shoulders 36, integral with the diaphragm. A head 37 is screwed into the open end of each chamber, through which passes the rod 38 of piston 39. The toggle-links 29 are disposed parallel with the diaphragm to avoid interference with the bucket-wheel 4 and engage the lever-arms 30, whose sleeves 31 are disposed vertically and rotate on a bushing 40, surrounding a journal-bolt 41, screwed into a threaded opening in the diaphragm. The stage-valve 42, similar in construction to the stage-valve 21, is provided at its inner end with an enlarged circular head 43, constituting a bevel-wheel similar to 15, which carries segmental sets of gear-teeth 44, which mesh with the segmental gears 32 on the sleeves 31. The valve in this case will be inserted through the inner opening 45 in the shoulder 18 of the diaphragm, in which the nozzle-bowl 19 is formed in the manner described in connection with Fig. 2. To relieve the friction of end thrust of the valve, I provide an antifriction ball-bearing for the outer end of the valve. This bearing is formed in a screw-plug 46, inserted in an opening opposite the valve, the inner end of the plug being provided with an undercut annular groove 47, forming part of a raceway for antifriction-balls 48. The balls are retained in the groove by a screw 49, whose flaring head overhangs the ball-race, completing the same and preventing the displacement of the balls. It will be obvious that this bearing can be adjusted by screwing the plug 46 to or from the motor, so as to properly relieve the pinion-journal bolt of strain. The controller fluid-pressure is supplied to these stage-valve motors through pipes or conduits 50 and 51, which lead through the turbine-casing and enter opposite ends of the motor-cylinders.

In the figures last described I have shown the diaphragm provided with radial strengthening-webs 52, leading from its hub to the shoulder 18, between which webs the several valves and their actuating mechanisms are disposed in radial alinement.

The rotary valves are perfectly balanced when opened, and their motors are fully capable of moving them from their unbalanced closed position to open them, without the expenditure of any large amount of energy, by the use of power-increasing devices, such as illustrated. A controller mechanism such as described in Letters Patent heretofore issued to me may be utilized to move the motor-pistons to their full stroke to operate the valves without intermediate operating positions and to control the several valves, so that they successively act to increase or diminish the supply of fluid-pressure in accordance with the load or speed.

Other forms of power-increasing devices may be utilized within the scope of my invention to operate the valves, and the latter may differ as to details of construction and gear connections, it being the purpose of my present invention to protect, broadly, means for forcing a rotary, semirotary, or oscillatory valve firmly against its seat by the use of power-increasing devices which act to move the valve against a fulcrum resistance. It is also my intention to protect, broadly, the valve-operating mechanism for any type of motor and in connection with any kind of power device, such as a fluid or hydraulic motor, cam, or any kind of actuator.

Having described my invention, what I claim as new, and desire to protect by Letters Patent, is—

1. In a fluid-motor, a rotary valve, a power device for moving said valve, and motion-transmission means between said valve and actuator which increase the power of the latter in moving said valve against an opposing force.

2. In a motor, a rotary fluid-pressure valve, a port or passage controlled by said valve, an actuator adapted to move said valve with increasing power, and means to enable said actuator to positively force said valve against its seat to close said port or passage.

3. In a motor, a rotary valve for a fluid-conduit, a shoulder on said valve, a stop adapted to engage said shoulder to arrest the travel of said valve after it has assumed a closed position, and power devices to force said valve against its stop and-seat.

4. In a motor, a rotary fluid-pressure valve controlling a fluid port or passage, an actuator connected through power-increasing devices to said valve, and means to stop the travel of said valve when it has closed said port or passage, which acts, as a fulcrum, against which said actuating devices force said valve to hold it against its seat, 5. In a motor, a rotary motor-fluid valve, an adjustable stop to arrest the movement of the valve as it assumes its closed position, and valve-operating mechanism which acts against said stop, as a fulcrum, to force said valve against its seat.

6. In a motor, a rotary motor-fluid valve, and a toggle-press for actuating said valve with variable speed and power against resistance and forcing it against its seat.

7. In an elastic-fluid turbine, a rotary motor-fluid valve, a reciprocatory actuator for said valve, a gear transmission means between said actuator and valve and an adjustable stop for said valve.

8. In a motor, a fluid-passage, a rotary valve therefor, a toggle-press, and gear means to transmit motion from said toggle-press to said valve.

9. In an elastic-fluid turbine, a nozzle-passage having a radially-elongated admission end and a peripherally-elongated discharge end which covers a section of a set of buckets mounted upon a rotating element, in combination with a substantially radially disposed rotary valve for controlling the flow of fluid-pressure through said nozzle.

10. In a turbine, a nozzle-passage having an entrance which is radially elongated and an intermediate portion which is contracted radially and gradually elongated peripherally to its discharge end which corresponds substantially in radial width with a set of rotatable buckets, and a rotary valve for controlling the flow of motor fluid through said nozzle.

11. In an elastic-fluid turbine, a rotary motor-fluid valve, and a reciprocating actuator therefor which moves in the direction of the axis of rotation of said valve, said valve and actuator being disposed substantially radially to the axis of rotation of the turbine.

12. In a multistage-turbine, a rotary nozzle-valve, a reciprocating motor for actuating said valve which is disposed in substantial axial alinement with said valve.

13. In an elastic-fluid turbine, a rotary valve controlling the flow of motor fluid against a rotatable element, a reciprocating actuator for said valve disposed end to end therewith, and transmission means between said valve and actuator whereby the latter's lineal movement is converted into rotary motion and applied to the former to fully open and close the same.

14. In a turbine, a nozzle-passage, a substantially radially disposed rotary valve therefor which is operated by a gear device at one end thereof, and a fluid-motor for actuating said gear means and controlling the operation of said valve.

15. In a turbine, a nozzle-passage, a substantially radially disposed rotary valve therefor provided with gear-teeth at one end, and a valve-operating mechanism comprising a toothed element which meshes with the toothed end of said valve for rocking the same.

16. In an elastic-fluid turbine, a diaphragm-partition, a fluid-conduit between stages leading through said diaphragm, a rotary valve for said conduit having its inner end provided with gear-teeth, and gear means meshing with said valve-gear and driven by a power device disposed within the turbine.

17. In a multistage-turbine, a rotary stage-valve, an actuator therefor within the turbine, and a lever connection between said actuator and valve which moves in a plane substantially parallel with that of a diaphragm-partition.

18. In a motor, a fluid-passage, a valve therefor, a power device to operate said valve and toggle means for transmitting motion from said device to said valve which comprise a pair of levers journaled on a stationary axis, toggle-links connecting said levers to said power device, and gear means to transmit motion from said levers to said valve.

19. In a turbine divided into wheel-compartments by diaphragms, a fluid-conduit between wheel-compartments, a rotatable valve for said conduit, and an actuator for said valve comprising a cylinder carried by said diaphragm, a piston and its rod which travel substantially radially from the turbine-shaft, one or more toothed levers pivotally mounted on the diaphragm and connected to said rod, and gear means for rocking said valve which mesh with said toothed lever or levers.

20. In an elastic-fluid turbine, a diaphragm-partition, a rotary valve seated in a shoulder of said diaphragm and controlling a stage-nozzle passage, a fluid-motor mounted on said diaphragm and having a radially-movable piston-rod, a gear driven by said rod and meshing with a gear connected to said valve, and antifriction means to take up the end thrust of said gear on said valve.

21. In a fluid-motor, a rotary fluid-pressure valve, a reciprocating motor movable axially with relation to said valve and connected to one end thereof, and an antifriction thrust-bearing for the other end of said valve.

22. In a fluid-motor, a rotary fluid-pressure valve, a reciprocating motor movable axially with relation to said valve and connected to one end thereof, and an adjustable antifriction thrust-bearing for the other end of said valve.

23. In a turbine, a diaphragm, a rotary valve seated therein, a motor for operating said valve connected to one end thereof, a screw-plug inserted in said diaphragm opposite the other end of said valve, a ball-race in said plug, and balls therein which engage said valve end.

24. In an elastic-fluid turbine, a conduit through which motor fluid is adapted to flow against a rotatable element, a rotatable valve therefor, means for moving said valve which projects outside of the turbine, and a reciprocating motor disposed without the turbine and connected to said stem.

25. In an elastic-fluid turbine, a diaphragm-partition dividing the turbine into wheel-compartments, strengthening-webs leading radially from the center of the diaphragm to or near its periphery, valves for motor-fluid passages, and actuating devices therefor which are mounted on the diaphragm between said webs.

In testimony whereof I have hereunto set my hand in presence of two subscribing witnesses.

JAMES WILKINSON.

Witnesses:
  W. E. DOUGLAS,
  A. R. FORSYTH.